United States Patent
Baker et al.

(10) Patent No.: US 7,193,654 B2
(45) Date of Patent: Mar. 20, 2007

(54) EQUIPMENT AND TECHNIQUES FOR INVISIBLE SEAMING OF MULTIPLE PROJECTION DISPLAYS

(75) Inventors: Kenneth T. Baker, Oakville (CA); Matt Cowan, Bloomingdale (CA)

(73) Assignee: IMAX Corporation (CA)

( * ) Notice: Subject to any disclaimer, the term of this patent is extended or adjusted under 35 U.S.C. 154(b) by 460 days.

(21) Appl. No.: 10/312,069

(22) PCT Filed: Jul. 3, 2001

(86) PCT No.: PCT/IB01/01175

§ 371 (c)(1),
(2), (4) Date: Mar. 21, 2003

(87) PCT Pub. No.: WO02/05553

PCT Pub. Date: Jan. 17, 2002

(65) Prior Publication Data

US 2003/0156262 A1    Aug. 21, 2003

Related U.S. Application Data

(60) Provisional application No. 60/215,716, filed on Jul. 3, 2000.

(51) Int. Cl.
*H04N 5/74* (2006.01)
*H04N 9/12* (2006.01)
*H04N 5/66* (2006.01)

(52) U.S. Cl. .................. 348/383; 348/744; 348/745; 345/1.3; 353/30; 353/97

(58) Field of Classification Search ........... 348/383, 348/744, 745, 756, 779; 345/1.3, 1.1; 353/30, 353/97, 122; 349/8
See application file for complete search history.

(56) References Cited

U.S. PATENT DOCUMENTS

| | | | |
|---|---|---|---|
| 3,909,525 A | | 9/1975 | Fagan |
| 4,638,309 A | | 1/1987 | Ott |
| 4,974,073 A | | 11/1990 | Inova |
| 5,011,277 A | | 4/1991 | Ogino et al. |
| 5,077,154 A | * | 12/1991 | Corley ............................ 430/4 |
| 5,085,495 A | | 2/1992 | Iwahara et al. |
| 5,116,117 A | | 5/1992 | Miyashita |
| 5,136,390 A | * | 8/1992 | Inova et al. ................. 348/383 |
| 5,153,621 A | | 10/1992 | Vogeley |

(Continued)

FOREIGN PATENT DOCUMENTS

CA        2227920        7/1999

(Continued)

OTHER PUBLICATIONS

Patent Abstracts of Japan, vol. 1999, No. 03, Mar. 31, 1999 & JP 10 319500 A (Fujitsu General Ltd.), Dec. 4, 1998.

(Continued)

*Primary Examiner*—David Ometz
*Assistant Examiner*—Jean W. Désir
(74) *Attorney, Agent, or Firm*—Kilpatrick Stockton LLP

(57) ABSTRACT

Apparatus and techniques for enhancing blending characteristics of a composite image formed by multiple projection displays are detailed. Included among the apparatuses and techniques is the use of masks, having complimentary, non-linear edges, between a projection axis and a screen. The masks are used to solve the geometric and photometric issues involved with blending sub-images to form a composite image.

30 Claims, 2 Drawing Sheets

U.S. PATENT DOCUMENTS

| | | | |
|---|---|---|---|
| 5,300,966 | A | 4/1994 | Uehira et al. |
| 5,382,990 | A | 1/1995 | Hath et al. |
| 5,386,253 | A | 1/1995 | Fielding |
| 5,400,093 | A | 3/1995 | Timmers |
| 5,490,009 | A | 2/1996 | Venkateswar et al. |
| 5,555,035 | A | 9/1996 | Mead et al. |
| 5,589,852 | A | 12/1996 | Thompson et al. |
| 5,612,753 | A | 3/1997 | Poradish et al. |
| 5,626,411 | A | 5/1997 | Takahashi et al. |
| 5,656,403 | A * | 8/1997 | Shieh .................... 430/30 |
| 5,771,072 | A * | 6/1998 | Tokoro et al. ........... 348/383 |
| 5,796,442 | A | 8/1998 | Gove et al. |
| 5,809,182 | A | 9/1998 | Ward et al. |
| 5,835,264 | A | 11/1998 | Tandler et al. |
| 5,844,663 | A | 12/1998 | Holley et al. |
| 5,847,784 | A | 12/1998 | Finnila et al. |
| 5,865,520 | A | 2/1999 | Kavanagh et al. |
| 5,902,030 | A | 5/1999 | Blanchard |
| 5,956,000 | A | 9/1999 | Kreitman et al. |
| 5,988,817 | A | 11/1999 | Mizushima et al. |
| 5,990,982 | A | 11/1999 | Gove et al. |
| 6,017,123 | A | 1/2000 | Bleha et al. |
| 6,115,022 | A | 9/2000 | Mayer, III et al. |
| 6,128,131 | A | 10/2000 | Tang |
| 6,193,375 | B1 | 2/2001 | Nagata et al. |
| 6,222,593 | B1 | 4/2001 | Higurashi et al. |
| 6,224,217 | B1 | 5/2001 | Tanaka |
| 6,276,801 | B1 | 8/2001 | Fielding |
| 6,373,603 | B1 | 4/2002 | Popovich et al. |
| 6,377,306 | B1 * | 4/2002 | Johnson et al. .......... 348/383 |
| 6,456,339 | B1 | 9/2002 | Surati et al. |
| 6,480,175 | B1 * | 11/2002 | Schneider ............... 345/32 |
| 6,545,685 | B1 * | 4/2003 | Dorbie ................... 345/582 |
| 6,570,623 | B1 * | 5/2003 | Li et al. ................. 348/383 |
| 6,590,621 | B1 * | 7/2003 | Creek et al. ............. 349/5 |
| 6,608,652 | B1 * | 8/2003 | Yamazaki et al. ....... 348/752 |
| 6,695,451 | B1 * | 2/2004 | Yamasaki et al. ........ 353/30 |
| 6,727,864 | B1 * | 4/2004 | Johnson et al. .......... 345/1.3 |
| 6,760,075 | B2 * | 7/2004 | Mayer et al. ............ 348/383 |
| 6,795,221 | B1 | 9/2004 | Urey |
| 2002/0024640 | A1 | 2/2002 | Ioka |
| 2002/0041364 | A1 | 4/2002 | Ioka |
| 2003/0016335 | A1 | 1/2003 | Penn |
| 2003/0063226 | A1 | 4/2003 | Gibbon et al. |
| 2003/0117714 | A1 | 6/2003 | Nakamura et al. |
| 2003/0156262 | A1 | 8/2003 | Baker |

FOREIGN PATENT DOCUMENTS

| | | |
|---|---|---|
| EP | 0 139 991 A2 | 5/1985 |
| EP | 0 606 162 A2 | 7/1994 |
| EP | 0 751 683 A2 | 1/1997 |
| EP | 0 786 687 A1 | 7/1997 |
| EP | 0 961 502 A2 | 12/1999 |
| EP | 1 058 158 A2 | 12/2000 |
| EP | 1 102 495 A2 | 5/2001 |
| EP | 1 137 290 A2 | 9/2001 |
| EP | 1 292 134 A2 | 3/2003 |
| FR | 2 774 481 | 8/1999 |
| GB | 2352836 A | 2/2001 |
| JP | 08 168039 A | 6/1996 |
| WO | WO 94/10675 | 5/1994 |
| WO | WO 95/25292 | 9/1995 |
| WO | WO 96/04582 | 2/1996 |
| WO | WO 00/54096 | 9/2000 |
| WO | WO 00/76210 A1 | 12/2000 |
| WO | WO 01/41455 | 6/2001 |
| WO | WO 01/96907 A2 | 12/2001 |
| WO | WO 02/19704 A2 | 3/2002 |
| WO | WO 03/050584 A1 | 6/2003 |

OTHER PUBLICATIONS

Chen and Johnson, "Fundamentals of Scalable High Resolution Seamlessly Tiled Projection System," Proc. SPIE, vol. 4294:67-74 (2001).

Patent Abstracts of Japan, vol. 017, No. 387 (P-1576), Jul. 20, 1993 & JP 05 066501 A (Toshiba Corp), Mar. 19, 1993.

Patent Abstracts of Japan, vol. 018, No. 373 (P-1769), Jul. 13, 1994 & JP 06 102484 A (Matsushita Electric Ind), Apr. 15, 1994.

* cited by examiner

EQUIPMENT AND TECHNIQUES FOR INVISIBLE SEAMING OF MULTIPLE PROJECTION DISPLAYS

CROSS-REFERENCE TO RELATED APPLICATIONS

This application claims priority to U.S. Provisional application Ser. No. 60/215,716 filed on Jul. 3, 2000 and International Application No. PCT/JB01/01175 filed on Jul. 3, 2001 and published in English as International Publication No. WO 02/05553 A2 on Jan. 17, 2002, the entire contents of which are incorporated herein by this reference.

FIELD OF THE INVENTION

This invention relates to projection of images and more specifically to techniques and equipment for enhancing the blending characteristics of composite images formed by multiple projection displays.

BACKGROUND OF THE INVENTION

U.S. Pat. No. 5,386,253 to Fielding, incorporated herein in its entirety by this reference, discusses exemplary projection systems utilizing one or more spatial light modulators (SLMs). As noted in the Fielding patent:

> Spatial light modulator devices include so-called "active matrix" devices, comprising an array of light modulating elements, or "light valves," each of which is controllable by a control signal (usually an electrical signal) to controllably reflect or transmit light in accordance with the control signal. A liquid crystal array is one example of an active matrix device; another example is the deformable mirror device (DMD) developed by Texas Instruments . . .

See Fielding, col. 1, II. 13–21. Of course, yet other types of light "engines," or sources, and projectors exist, and various of them may be used in connection with the inventions described herein.

Regardless of the type of projector used, audiences frequently desire to see images high in detail and richness and low in objectionable artifacts. High resolution and image quality in particular facilitates suspension of disbelief of an audience as to the reality of the projected images. Such quality indeed often is an important factor in the overall success of the motion picture viewing experience among today's audiences.

Producing these high-resolution images is not without added cost, however. Imax Corporation, for example, the intended assignee of this application, utilizes not only specialized cameras and projectors, but also seventy millimeter, fifteen perforation film to increase the resolution and quality of projected images. Conventional electronic projectors (and especially those utilizing SLMs), by contrast, generally cannot supply equivalent resolution in projected images. As well, such electronic projectors frequently fail to furnish the dynamic range and overall brightness of images provided by large-format films. They nonetheless may desirably (or necessarily) be employed to display non-film-based images such as (but not limited to) computer-generated graphics or material captured with electronic cameras.

In order to achieve the desired resolution, conventional electronic projection systems have employed "tiling" techniques. Tiling involves the use of multiple projection displays of sub-images that are displayed adjacent to each other to form a composite image. The use of multiple projection displays allows for greater resolution than is available with a single projection display. The sub-images can be blended inside a single projector or if multiple projectors are used, the sub-images are blended on the screen. For example, when two projectors are used one projector projects a first sub-image on a screen. A second projector projects a second sub-image on a screen. The first and second projectors are positioned such that the first and second sub-images are projected onto a screen adjacent to each other.

It is difficult to align the projectors exactly and therefore undesirable seams between the first and second sub-images are often apparent to the viewer. To improve the appearance and continuity of the composite image, the first and second projectors are conventionally positioned such that the first image slightly overlaps the second image. Mere overlapping of sub-images typically is insufficient, however, as the additive intensity of the images in the regions of overlap in some scenes likewise may be noticeable to audiences. General methods of reducing brightness in these regions typically include adjusting the images either electronically or optically; the latter method is usually implemented using an opaque or reflective element placed in the beam of light. Thus, invisible seaming of multiple projectors requires careful matching of the displays at the seam area(s), both geometrically and photometrically.

U.S. Pat. No. 6,017,123 to Bleha et al., incorporated herein in its entirety by reference, discloses one system and method for blending sub-images. FIG. 13 of Bleha et al. shows the use of filters and masks, located between the projection lens and the screen, to blend the sub-images. The mask used by Bleha is a knife edged mask. Introducing simple knife edge masks into the optical path, in front of the projection lens, generally produces a guassian blurred edge, which when combined with a complimentary edge on the other projection lens, and precisely aligned so that the sum of their black levels remains as constant as possible throughout the overlapped seam area, will produce a very good uniform black level throughout the image, including the seam area. These knife edges block the image from the respective projectors outside of the overlap region, eliminating stray light that often surrounds images from most projection technologies. However, simple straight knife edges introduce a luminance "ringing," whereby the edge has a slightly sinusoidal pattern to the decay from full luminance to system black. This "ringing" is generally attributed to artifacts arising from integrating bars utilized in projection system lamphouses, or from simple edge diffraction effects, and leads to an obvious line pattern along the seam visible in gray scale and peak white images. Other traditional methods of butt seaming or overlapping images have typically failed to achieve sufficient precision in matching to make the seam truly invisible for a wide range of image content or projection geometries.

Therefore, techniques and equipment for blending multiple projection displays to form a single display with solutions to the geometric and photometric issues is desirable.

SUMMARY OF THE INVENTION

The present invention seeks to provide solutions to resolve these geometric and photometric issues and provide an invisible seam when two or more sub-images are blended together to form a composite image. It further does so in a more comprehensive manner than heretofore considered, attempting to create equipment and techniques capable of providing images of sufficient overall quality that they may be used in venues instead of, or in addition to, traditional large-format film projectors without disturbing audience perception that the viewed images are of high quality. As noted above, this perception is a significant aspect of modern-day viewing experiences, at times helping determine overall success among the public of particular motion pictures.

The present invention solves these problems optically by using masks with complimentary, non-linear edges placed between the projection axis and a screen. In one embodiment the mask edges are a saw tooth shape. Many other complementary, non-linear edges are possible.

DETAILED DESCRIPTION OF THE DRAWINGS

Figure 1:
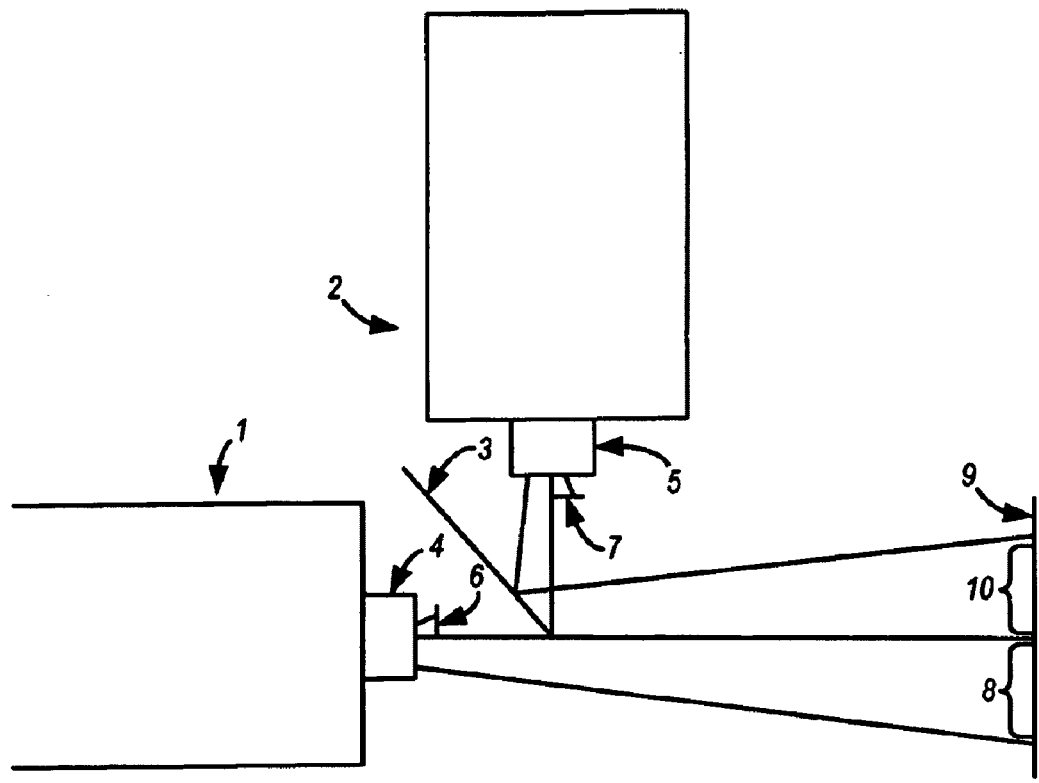
FIG. 1 is a schematized diagram of an exemplary system.

FIG. 1 illustrates a schematized diagram of one possible embodiment of the present invention. As shown in FIG. 1, in this embodiment two SLM projectors 1 and 2 are used. This invention could be applied to a wide range of projection technologies or be internalized inside a single projection system as an integrated package. The present invention could also be utilized with more than two projectors.

As shown in FIG. 1, projector 1 is positioned so that its projection axis projects just past a 45 degree front surface mirror 3. Projector 2 is located orthogonally to projector 1 so that its projection axis is reflected off the front surface mirror 3. The image presented by the projector 2 is electronically flipped, if necessary, using techniques known in the art. The arrangement of FIG. 1 allows the two projectors to have near-coincident virtual projection points, without the losses and ghost images caused when using a beam splitter mirror. This coincidence is desirable in order to reduce the effects of screen gain. When the projection points are not coincident the seam will be made more visible by the difference in brightness across the screen since the reflected light from different projection points arrives at different points for off axis observers.

Mask 6 is placed between lens 4 and a screen 9 so that the mask 6 edge overlaps slightly with the projection axis of projector 1. Similarly, mask 7 is placed between lens 5 and the mirror 3 so that its edge overlaps slightly with the projection axis of projector 2. As shown in FIG. 1, a sub-image 8 produced by projector 1 is displayed on a screen 9 adjacent to a sub-image 10 produced by projector 2.

A beamsplitter could be used with the embodiment shown in FIG. 1. With a beam splitter it is possible to achieve perfect coincidence, but typically a 50% or more light loss is experienced. The beam splitter is positioned at the intersections of the light from projectors 1 and 2 so that the light from projector 1 is transmitted by the beam splitter to the screen, and the light from projector 2 is reflected through 90 degrees to the screen. The masks for each lens remain in the locations shown in FIG. 1.

The lens 4 of projector 1 and the lens 5 of projector 2 are horizontally offset or shifted (for a vertical seam) so that the seamed area of the image falls within a narrow margin of the lens optical axis (generally less than 5–10% of the format width), while the images themselves are free of keystoning. This generally allows the virtual projection point of the reflected image to be located near co-incidentally with the other projection point, within a very small fraction of the lens focal length, depending on projection angles, seam width desired, and lens parameters such as exit pupil size and location. (Typically, the axis of a lens is most free of aberration, which, if present, could affect the visibility of a seam.)

In another embodiment, two forward looking projectors (both lenses facing directly to the screen) mounted so their lenses are as close together as possible could be used. Such an embodiment will produce sufficiently accurate alignment (sub-pixel) on the screen to eliminate the need for the mirror at least for geometric considerations.

Having achieved good geometric alignment of the images from two projectors, luminance and color space matching of the two projectors can be achieved using techniques known in the art. Care and precision are necessary to achieve required tolerances—with a wider blend area allowing more relaxed tolerances. SLM based projectors in particular offer very good stability and are very well suited to achieving the required tight matching. SLM projectors are not a prerequisite for these techniques.

Figure 2:
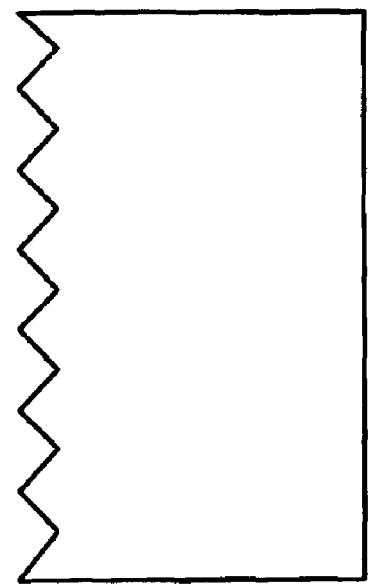
FIG. 2 is a schematized diagram of an exemplary mask.

To alleviate the luminance ringing effect caused by using a knife edged mask of the prior art; the present invention uses masks with complimentary but nonlinear edges in the optical path. FIG. 2 shows an exemplary embodiment of a mask. The mask may be made of metal and painted with a flat black paint or otherwise treated to reduce reflections. The use of masks such as shown in FIG. 2 produces a series of alternating diagonal seams, which although still containing the line patterns or "ringing" of the prior art, are now broken up visually to the point that even in peak white or grey scale images the seam is essentially invisible. FIG. 2 shows a mask with a simple zig-zag or saw tooth pattern, preferably with a frequency of 7–10 points across the seam. A multitude of other complimentary patterns such as sinusiodal or even random patterns have proven successful. Color fringing or patterning effects are also noted with the use of masks. These effects are attributed in part to the axial chromatic aberrations present in the projection lens. Since the mask is in an out of focus position with respect to the image plane, rays of different color light may intersect the mask at different points for a given field position for the mask. This contributes to a color "fringe." In addition, DMD based projectors do not have completely uniform illumination of all colors, and the presence of the mask may act to highlight these non-uniformities.

In one embodiment, the mask is placed as close to the outside of the lens pupil as possible with the non-linear edge of the mask along the optical axis. However, the mask could be placed farther away from the lens pupil or could come before the lens.

Figure 3:
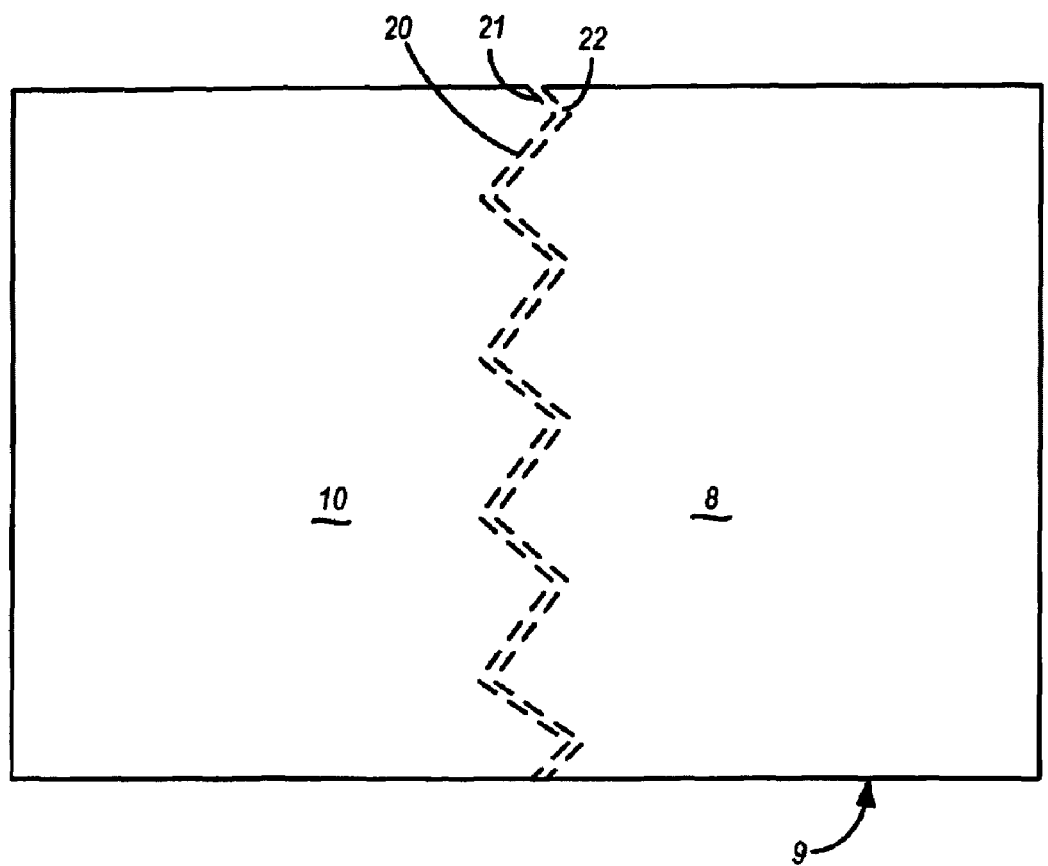
FIG. 3 is a schematized depiction of a first sub-image tiled with a second sub-image.

FIG. 3 illustrates a schematized depiction of the blended image of sub-image 8 and sub-image 10 on the screen 9. As shown in FIG. 3, masks with complementary and non-linear edges in a saw tooth pattern are used. The overlap section 20 is depicted as in between the dotted lines 21 and 22. The two sub-images 8 and 10 projected using the embodiment of FIG. 1 are generally overlapped by about 5–10% of the format dimension at the seam, which means good sub-pixel geometric alignment must be maintained over this region.

Further digital correction of the images presented to the projectors could be used in conjunction with the present invention—such as introducing negative "rings" into the images to offset the optical effects. A variety of digital processing techniques known in the art, such as using feedback imaging systems to measure luminance or geometrical variations across seams and adjusting the images accordingly, could be used for this purpose.

The foregoing is provided for purposes of illustrating, explaining, and describing embodiments of the present invention. Thus, further modifications and adaptations to these embodiments will be apparent to those skilled in the art and may be made without departing from the scope or spirit of the invention. Yet, additionally ferroelectric devices, liquid-crystal displays (LCD), self luminous array devices, laser scanning systems incorporating electro-optical or electromechanical scanning devices, or other light sources or valves may be employed as necessary or desired.

What is claimed is:

1. A projection system, comprising:
    at least one projection device having a first lens and a second lens, the projection device projecting a first sub-image through the first lens and a second sub-image through the second lens;
    a screen for displaying the first sub-image and the second sub-image;
    a first mask positioned between the first lens and the screen, the first mask having a first non-linear edge in an optical path of the first sub-image creating a first non-linear image edge; and
    a second mask positioned between the second lens and the screen, the second mask having a second non-linear edge, that is complimentary to the first mask, in an optical path of the second sub-image creating a second non-linear image edge complimentary to the first non-linear image edge,
    wherein the first sub-image and second sub-image are combined on the screen such that the first sub-image and the second sub-image overlap at the first non-linear image edge and the second non-linear image edge to form a non-linear seam.

2. The projection system of claim 1 wherein the projection device is a spatial light modulator type projector.

3. The projection system of claim 1 wherein the projection device is a deformable mirror device type projector.

4. The projection system of claim 1 wherein the projection device is a liquid crystal device type projector.

5. The projection system of claim 1 wherein the projection device is a ferroelectric type projector.

6. The projection system of claim 1 wherein the projection device is a self luminous array type projector.

7. The projection system of claim 1 wherein the projection device is a laser scanning system type projector.

8. The projection system of claim 1 wherein the first lens and the second lens free the screen.

9. The projection system of claim 1 wherein the first non-linear edge of the first mask is a first saw tooth pattern and the second non-linear edge of the second mask is a second saw toot pattern.

10. The projection system of claim 9 wherein the first saw tooth pattern has a pattern of teeth formed from +45 degree and −45 degree lines and the second saw tooth pattern has a pattern of teeth formed from +45 degree and −45 degree lines.

11. The projection system of claim 1 wherein the first mask is positioned close to the first lens and the second mask is positioned close to the second lens.

12. The projection system of claim 1 wherein the sub-images are corrected digitally to offset optical effects.

13. A projection system, comprising:
    a first projection device having a first projection axis and including a first lens having a lens axis, the first projection device projecting a first sub-image through the first lens;
    a second projection device having a second projection axis and including a second lens having a lens axis, the second projection device projecting a second sub-image through the second lens;
    a screen for displaying the first sub-image and the second sub-image;
    a first mask positioned between the first lens and the screen, the first mask having a first non-liner edge in the optical path of the first sub-image creating a first non-linear image edge; and
    a second mask positioned between the second lens and the screen, the second mask having a second non-linear edge, that is complimentary to the first mask, in the optical path of the second sub-image creating a second non-linear image edge complimentary to the first non-linear image edge,
    wherein the first sub-image is adjacent to the second sub-image on the screen such that the first sub-image and the second sub-image overlap at the first non-linear image edge and the second non-linear image edge to form a non-linear seamed area.

14. The projection system of claim 13 wherein the first projection device and the second projection device are spatial light modulator type projectors.

15. The projection system of claim 13 wherein the first projection device and the second projection device are deformable mirror device type projectors.

16. The projection system of claim 13 wherein the first projection device and the second projection device are liquid crystal device type projectors.

17. The projection system of claim 13 wherein the first projection device and the second projection device are ferroelectric type projectors.

18. The projection system of claim 13 wherein the first projection device and the second projection device are self luminous array type projectors.

19. The projection system of claim 13 wherein the first projection device and the second projection device are laser scanning system type projectors.

20. The projection system of claim 13 wherein the first projection device is offset from the second projection device so that the seamed area falls within a narrow margin of the first lean axis and the second lens axis.

21. The projection system of claim 13 wherein the first lens and the second lens face the screen.

22. The projection system of claim 13 wherein the first projection device and the second projection device have substantially coincident virtual projection points.

23. The projection system of claim 13 wherein the first mask overlaps the first projection axis of the first projection device and the second mask overlaps the second projection axis of the second projector.

24. The projection system of claim 13 wherein the first non-linear edge of the first mask is a first saw tooth pattern and the second non-linear edge of the second mask is a second saw tooth pattern.

25. The projection system of claim 24 wherein the first saw tooth pattern has a pattern of teeth formed from +45 degree and −45 degree lines and the second saw tooth pattern has a pattern of teeth formed from +45 degree and −45 degree lines.

26. The projection system of claim 13 wherein the first projection axis of the first projection device is substantially perpendicular to the second projection axis of the second projection device and the projection system further comprises a mirror for reflecting the second sub-image on the screen.

27. The projection system of claim 26 wherein the second sub-image is electronically flipped.

28. The projection system of claim 13 wherein the first projection axis of the first projection device is substantially perpendicular to the second projection axis of the second projection device and the projection system further comprises a beam splitter positioned at the intersection of the first and second projection axes so that the first sub-image is transmitted to the screen and the second sub-image is reflected on to the screen.

29. The projection system of claim 13 wherein the first mask is positioned close to the first lens and the second mask is positioned close to the second lens.

30. The projection system of claim 13 wherein the sub-images are corrected digitally to offset optical effects.

* * * * *